US010544525B2

(12) United States Patent
Kamiya

(10) Patent No.: US 10,544,525 B2
(45) Date of Patent: Jan. 28, 2020

(54) FIBROUS STRUCTURE AND FIBER-REINFORCED COMPOSITE MATERIAL

(71) Applicant: KABUSHIKI KAISHA TOYOTA JIDOSHOKKI, Kariya-shi, Aichi-ken (JP)

(72) Inventor: Ryuta Kamiya, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 251 days.

(21) Appl. No.: 15/529,006

(22) PCT Filed: Nov. 5, 2015

(86) PCT No.: PCT/JP2015/081208
§ 371 (c)(1),
(2) Date: May 23, 2017

(87) PCT Pub. No.: WO2016/084575
PCT Pub. Date: Jun. 2, 2016

(65) Prior Publication Data

US 2017/0268137 A1 Sep. 21, 2017

(30) Foreign Application Priority Data

Nov. 25, 2014 (JP) ................................ 2014-238092

(51) Int. Cl.
*D03D 15/04* (2006.01)
*B29C 70/24* (2006.01)
(Continued)

(52) U.S. Cl.
CPC ............ *D03D 15/04* (2013.01); *B29C 70/24* (2013.01); *B29C 70/48* (2013.01); *C08J 5/042* (2013.01);
(Continued)

(58) Field of Classification Search
None
See application file for complete search history.

(56) References Cited

U.S. PATENT DOCUMENTS 4,379,798 A * 4/1983 Palmer .................... B29C 70/24 428/113
4,922,968 A 5/1990 Bottger et al.
(Continued)

FOREIGN PATENT DOCUMENTS

JP 11-269755 A 10/1999
JP 2011-506784 A 3/2011

OTHER PUBLICATIONS

International Preliminary Report on Patentability with translation of the Written Opinion issued from the International Bureau in counterpart International Application No. PCT/JP2015/081208 dated May 30, 2017.

(Continued)

*Primary Examiner* — Arti Singh-Pandey
(74) *Attorney, Agent, or Firm* — Sughrue Mion, PLLC

(57) ABSTRACT

A fibrous structure includes a main plate and a sub-plate. The main plate, which is formed by a multi-layer textile, includes a plurality of stacked fiber layers. Each fiber layer includes main plate warps and main plate wefts. The sub-plate, which is formed by a multi-layer textile, includes a plurality of stacked fiber layers. Each fiber layer includes sub-plate warps and sub-plate wefts. The main plate and the sub-plate are integrally woven with each other in a state intersecting each other. The main plate wefts and the sub-plate wefts have a smaller volume density at an intersecting portion where the main plate and the sub-plate intersect than a portion separate from the intersecting portion.

7 Claims, 3 Drawing Sheets

(51) Int. Cl.

| | |
|---|---|
| ***B29C 70/48*** | (2006.01) |
| ***C08J 5/04*** | (2006.01) |
| ***C08J 5/24*** | (2006.01) |
| ***D03D 13/00*** | (2006.01) |
| ***D03D 25/00*** | (2006.01) |

(52) U.S. Cl.

CPC .............. *C08J 5/24* (2013.01); *D03D 13/008* (2013.01); *D03D 25/005* (2013.01); *D10B 2101/12* (2013.01); *D10B 2505/02* (2013.01)

(56) References Cited

U.S. PATENT DOCUMENTS 6,446,675 B1 * 9/2002 Goering ............... D03D 25/005 139/11
9,290,865 B2 * 3/2016 McClain ................. B29B 11/16
9,604,389 B2 * 3/2017 Gilbertson .............. B29B 11/16
2009/0149100 A1 6/2009 Goering
2013/0099062 A1 4/2013 Seack et al.
2013/0333793 A1 * 12/2013 Dambrine ............. D03D 11/00 139/408
2014/0283944 A1 * 9/2014 Juillard ..................... D01F 9/12 139/384 R

OTHER PUBLICATIONS

Communication dated Dec. 5, 2017, from State Intellectual Property Office of the P.R.C. in counterpart application No. 201580063150. X.

* cited by examiner 11a
41
22
40
42a
42
11a
13
12
23
20
10
30
21a
42b
21a
X Direction
Y Direction 20
42
W
22
41
42a
23
10
13
12
42b
30

20
20
23
22
23
22
W
21a
21
21a
33
11
11a
12
13
10
12
13
10
30
11a

FIBROUS STRUCTURE AND FIBER-REINFORCED COMPOSITE MATERIAL

CROSS REFERENCE TO RELATED APPLICATIONS

This application is a National Stage of International Application No. PCT/JP2015/081208 filed Nov. 5, 2015, claiming priority based on Japanese Patent Application No. 2014-238092 filed Nov. 25, 2014, the contents of all of which are incorporated herein by reference in their entirety.

TECHNICAL FIELD

The present invention relates to a fibrous structure and a fiber-reinforced composite material formed by impregnating the fibrous structure with a matrix resin.

BACKGROUND ART

A fiber-reinforced composite material is widely used as a light structural material. A reinforcement base for a fiber-reinforced composite material includes a fibrous structure formed from textile. A composite material formed by the fibrous structure and a matrix resin is used as a structural material for rockets, airplanes, bicycles, ships, and buildings.

Patent document 1 discloses an example of a fibrous structure. As shown in FIG. 6A, a fibrous structure 80 of patent document 1 includes a flat base plate 81 (main plate) and a T-shaped rib 82 (sub-plate) that is coupled to the base plate 81 by thickness-wise direction yarns 83.

The T-shaped rib 82 includes two L-shaped fibrous structures 82*a* that are coupled to each other. The thickness-wise direction yarns 83 are extended along a portion of the rib 82 overlapping the base plate 81 to couple the rib 82 and the base plate 81. However, the portion of the rib 82 where the thickness-wise direction yarns 83 extend increases the weight and material cost of the fibrous structure 80.

Patent document 2 discloses a method for manufacturing a main plate and a sub-plate, which intersects the main plate, from fiber layers that have been woven in advance. As shown in FIG. 6B, in the manufacturing method disclosed in patent document 2, a fiber layer 90 that forms a horizontal main plate and a fiber layer 91 that forms a sub-plate, which is perpendicular to the main plate, are first woven integrally with each other. The two fiber layers 90 and 91 are formed by weaving warps and wefts. The textile is opened from an intersecting portion of the two fiber layers 90 and 91 to form the main plate and the sub-plate and manufacture a fibrous structure having the desired shape.

PRIOR ART DOCUMENT

Patent Documents

Patent Document 1: Japanese Laid-Open Patent Publication No. 11-269755

Patent Document 2: Japanese National Phase Laid-Open Patent Publication No. 2011-506784

SUMMARY OF THE INVENTION

Problems that are to be Solved by the Invention

However, in the fibrous structure obtained with the manufacturing method disclosed in patent document 2, the warps and the wefts of the two fiber layers 90 and 91 are mixed in the intersecting portion of the fiber layer 90, which forms the horizontal main plate, and the fiber layer 91, which forms the perpendicular sub-plate. This increases the weight of the intersecting portion and consequently increases the weight of the fibrous structure. Further, the intersecting portion has a large volume capacity of a yarn in a unit region. Thus, yarns in the intersecting portions are easily bent. This decreases the strength at the intersecting portion.

It is an object of the present invention to provide a fibrous structure and a fiber-reinforced composite material that limits increases in weight and decreases in strength at an intersecting portion.

Means for Solving the Problem

A fibrous structure that solves the above problem includes a main plate and a sub-plate. The main plate, which is formed by a multi-layer textile, includes a plurality of stacked fiber layers. Each fiber layer includes main plate warps and main plate wefts. The sub-plate, which is formed by a multi-layer textile, includes a plurality of stacked fiber layers. Each fiber layer includes sub-plate warps and sub-plate wefts. The main plate and the sub-plate are integrally woven with each other in a state intersecting each other. The main plate wefts and the sub-plate wefts have a smaller volume density at an intersecting portion where the main plate and the sub-plate intersect than a portion separate from the intersecting portion.

EMBODIMENTS OF THE INVENTION

One embodiment of a fibrous structure and a fiber-reinforced composite material will now be described with reference to FIGS. 1 to 3.

Figure 1:
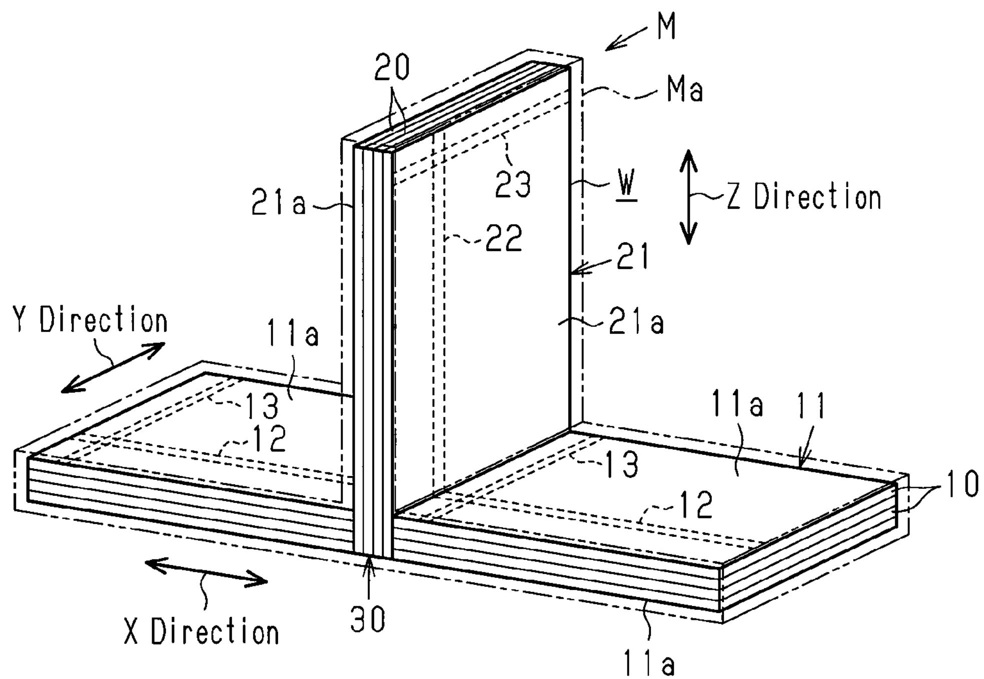
FIG. 1 is a perspective view showing one embodiment of a fiber-reinforced composite material.

Referring to FIG. 1, a fiber-reinforced composite material M is formed by impregnating a fibrous structure W with a matrix resin Ma.

First, the fibrous structure W will be described.

Figure 2:
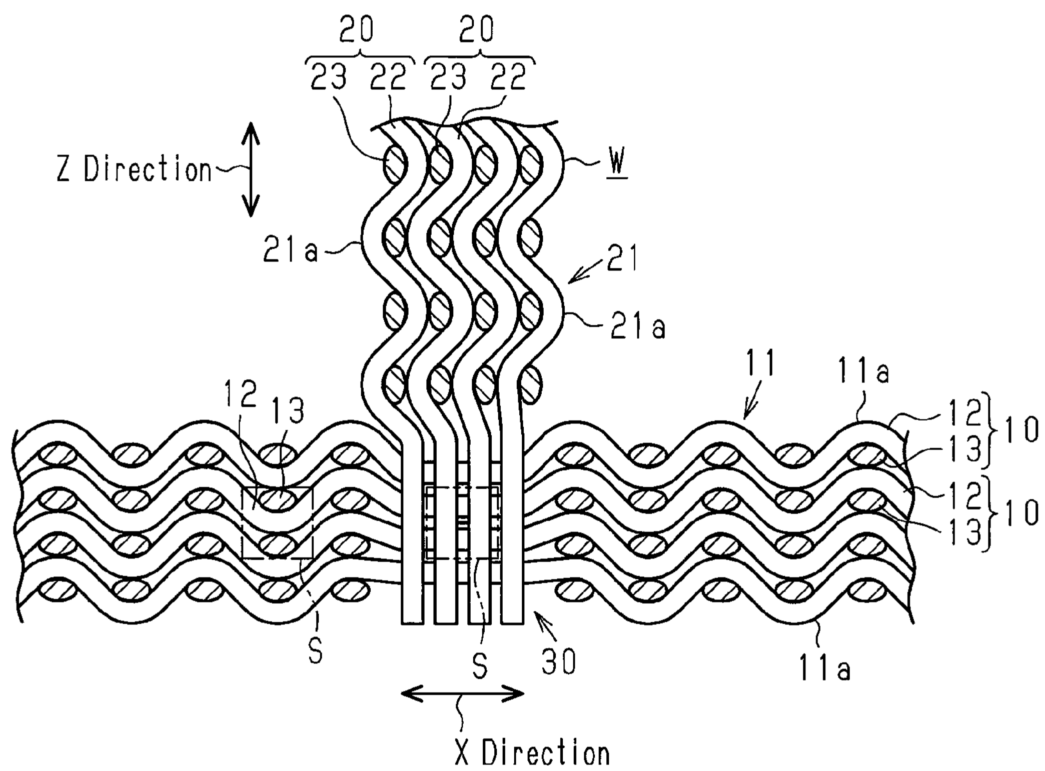
FIG. 2 is a cross-sectional view showing a main plate, a sub-plate, and an intersecting portion.

As shown in FIGS. 1 and 2, the fibrous structure W includes a main plate 11 and a sub-plate 21 that is orthogonal to the main plate 11. The main plate 11 and the sub-plate 21 have the form of a rectangular plate. The main plate 11 and the sub-plate 21 are woven integrally with each other. The sub-plate 21 functions as a reinforcement rib of the main plate 11. The fibrous structure W is T-shaped.

The main plate 11, which is formed by a multi-layer textile, includes a plurality of (four) stacked main plate fiber layers 10. Each main plate fiber layer 10 is formed by weaving main plate warps 12, which are formed from reinforcement fibers, and main plate wefts 13, which are formed from reinforcement fibers. "Reinforcement fibers" refer to fiber bundles that serve to reinforce the matrix resin Ma of the fiber-reinforced material M when the main plate 11 is used as a fiber base of the fiber-reinforced material M. In the present embodiment, carbon fibers are used as the reinforcement fibers, and the main plate warps 12 and the main plate wefts 13 are yarns of the same carbon fiber.

Further, the main plate warps 12, which form a fiber bundle, extend straight in parallel to one another. In the same manner, the main plate wefts 13, which form a fiber bundle, extend straight in parallel to one another in a direction intersecting (orthogonal to) the main plate warps 12. Each main plate fiber layer 10 is formed by plain-weaving the main plate warps 12 and the main plate wefts 13. The main plate 11 includes flat surfaces 11*a* located at two ends in the stacking direction of the main plate fiber layers 10. Each flat surface 11*a* has a rectangular shape and is formed by surfaces of the main plate warps 12 and the main plate wefts 13.

The sub-plate 21, which is formed by a multi-layer textile, includes a plurality of (four) stacked sub-plate fiber layers 20. Each sub-plate fiber layer 20 is formed by weaving sub-plate warps 22, which are formed from reinforcement fibers, and sub-plate wefts 23, which are formed from reinforcement fibers. "Reinforcement fibers" refer to fiber bundles that serve to reinforce the matrix resin Ma of the fiber-reinforced material M when the sub-plate 21 is used as a fiber base of the fiber-reinforced material M. In the present embodiment, carbon fibers are used as the reinforcement fibers, and the sub-plate warps 22 and the sub-plate wefts 23 are yarns of the same carbon fiber.

Further, the sub-plate warps 22, which form a fiber bundle, extend straight in parallel to one another. In the same manner, the sub-plate wefts 23, which form a fiber bundle, extend straight in parallel to one another in a direction intersecting (orthogonal to) the sub-plate warps 22. Each sub-plate fiber layer 20 is formed by plain-weaving the sub-plate warps 22 and the sub-plate wefts 23. The sub-plate 21 includes flat surfaces 21*a* located at two ends in the stacking direction of the sub-plate fiber layers 20. Each flat surface 21*a* has a rectangular shape and is formed by surfaces of the sub-plate warps 22 and the sub-plate wefts 23.

The direction in which the main plate warps 12 extend in the main plate 11 is referred to as the X direction of the fibrous structure W, and the direction in which the sub-plate warps 22 extend in the sub-plate 21 is referred to as the Z direction of the fibrous structure W. The direction in which the main plate wefts 13 and the sub-plate wefts 23 extend in the main plate 11 and the sub-plate 21 is referred to as the Y direction of the fibrous structure W. In this case, the X direction is orthogonal to the Y direction, the Y direction is orthogonal to the Z direction, and the X direction is orthogonal to the Z direction. Thus, in the fibrous structure W, the direction (Z direction) in which the sub-plate warps 22 extend in the sub-plate 21 is orthogonal to the direction (X direction) in which the main plate warps 12 extend in the main plate 11.

In the main plate 11, the Z direction is the stacking direction of the main plate fiber layers 10. The main plate 11 includes the flat surfaces 11*a* located at the two ends in the Z direction. In the sub-plate 21, the X direction is the stacking direction of the sub-plate fiber layers 20. The sub-plate 21 includes the flat surfaces 21*a* located at the two ends in the X direction. The flat surfaces 11*a* of the main plate 11 are orthogonal to (intersect) the flat surfaces 21*a* of the sub-plate 21.

In the main plate 11, the main plate warps 12 extend straight in the X direction and have straightness. In the main plate 11, the main plate wefts 13 extend straight in the Y direction and have straightness. Accordingly, even if the main plate warps 12 and the main plate wefts 13, which are plain-woven, curve along with each other when the main plate warps 12 and the main plate wefts 13 contact one another, the main plate warps 12 and the main plate wefts 13 extend straight in the corresponding directions and thus have straightness.

In the sub-plate 21, the sub-plate warps 22 extend straight in the X direction and have straightness. In the sub-plate 21, the sub-plate wefts 23 extend straight in the Y direction and have straightness. Accordingly, even if the sub-plate warps 22 and the sub-plate wefts 23, which are plain-woven, curve when the sub-plate warps 22 and the sub-plate wefts 23 contact one another, the sub-plate warps 22 and the sub-plate wefts 23 extend straight in the corresponding directions and thus have straightness.

As shown in FIG. 2, the fibrous structure W includes an intersecting portion 30 where the main plate 11 intersects the sub-plate 21. The intersecting portion 30 is formed when the main plate 11 and the sub-plate 21 are woven integrally with each other. In the intersecting portion 30, the main plate warps 12 extending in the X direction intersect (are orthogonal to) the sub-plate warps 22 extending in the Z direction. The intersecting portion 30 is free from the main plate wefts 13 and the sub-plate wefts 23, which are the yarns extending in the Y direction. Thus, the intersecting portion 30 has a two-axis structure that includes only the main plate warps 12 and the sub-plate warps 22. In the fibrous structure W, the main plate 11 has a two-axis structure that includes the main plate warps 12 and the main plate wefts 13, and the sub-plate 21 has a two-axis structure that includes the sub-plate warps 22 and the sub-plate wefts 23.

In a unit region S of the intersecting portion 30, the number of yarns (main plate wefts 13 and sub-plate wefts 23) extending in the Y direction is zero. Thus, in the intersecting portion 30, the volume density that indicates the proportion of a volume occupied by the yarns (main plate wefts 13 and sub-plate wefts 23) in the unit region S extending in the Y direction is zero. A unit region S of the main plate 11 that is separate from the intersecting portion 30 includes the main plate wefts 13 that are the yarns extending in the Y direction. Thus, the volume density of the main plate wefts 13 in this unit region S is greater than zero. In addition, a unit region S (not shown) of the sub-plate 21 that is separate from the intersecting portion 30 includes the sub-plate wefts 23 that are yarns extending in the Y direction. Thus, the volume density of the sub-plate wefts 23 in the unit region S is greater than zero. Accordingly, the main plate wefts 13 and the sub-plate wefts 23 of the intersecting portion 30 have a smaller volume density than the main plate wefts and the sub-plate wefts at locations separate from the intersecting portion 30. The unit region S refers to a cuboid region of a unit length (for example, 10 cm).

Referring to FIG. 1, the fiber-reinforced composite material M is formed by impregnating the fibrous structure W with the matrix resin Ma. A thermosetting resin is used as the matrix resin Ma. The main plate 11 and the sub-plate 21 are impregnated with the matrix resin Ma.

The method for fabricating the fibrous structure W will now be described.

Figure 3A:
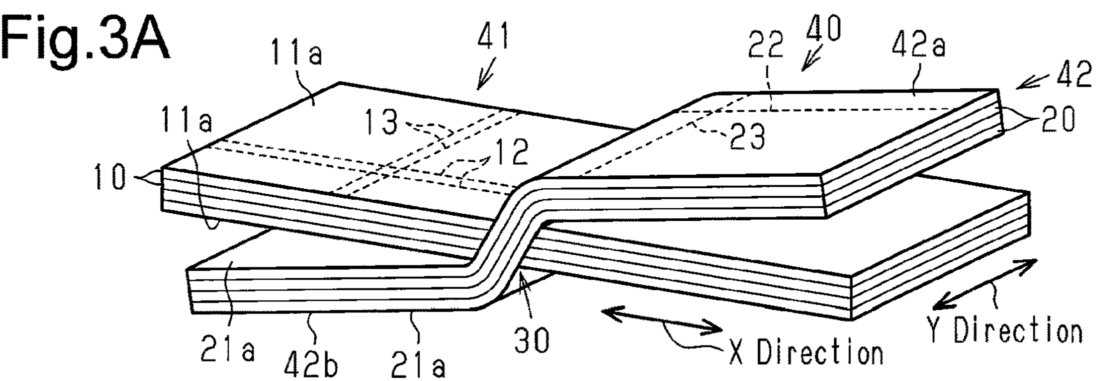
FIG. 3A is a perspective view showing a main plate precursor and a sub-plate precursor intersecting each other.

First, as shown in FIG. 3, a loom (not shown) plain-weaves the main plate warps 12 and the main plate wefts 13 into the main plate fiber layers 10. The main plate fiber layers 10 are simultaneously woven to fabricate a main plate precursor 41, which is a multi-layer structure of the main plate fiber layers 10.

At the same time as when fabricating the main plate precursor 41, the sub-plate warps 22 and the sub-plate wefts 23 are plain-woven into the sub-plate fiber layers 20. The sub-plate fiber layers 20 are simultaneously woven to fabricate a sub-plate precursor 42, which is a multi-layer structure of the sub-plate fiber layers 20.

The main plate precursor 41 and the sub-plate precursor 42 are fabricated so that the main plate warps 12 and the sub-plate warps 22 extend in the X direction and the main plate wefts 13 and the sub-plate wefts 23 extend in the Y direction. As a result, a flat fiber precursor 40 including the main plate precursor 41 and the sub-plate precursor 42 that overlap each other is fabricated.

During the fabricating process of the fiber precursor 40, insertion of the main plate wefts 13 and the sub-plate wefts 23 is not performed when intersecting the main plate precursor 41 and the sub-plate precursor 42. As a result, in the obtained fiber precursor 40, the intersecting portion 30 of the main plate precursor 41 and the sub-plate precursor 42 is free from the main plate wefts 13 and the sub-plate wefts 23.

In the fiber precursor 40, the main plate precursor 41 is located at two opposite sides of the intersecting portion 30 in the X direction. The main plate precursor 41, which is flat, includes the flat surfaces 11*a* located at the two ends in the stacking direction of the main plate fiber layers 10. The sub-plate precursor 42 includes the flat surfaces 21*a* located at the two ends in the stacking direction of the sub-plate fiber layers 20. The sub-plate precursor 42 includes a first projection 42*a* extending from one of the flat surfaces 11*a* of the main plate precursor 41 and a second projection 42*b* extending from the other flat surface 11*a* of the main plate precursor 41. Insertion of the sub-plate wefts 23 is not performed at the second projection 42*b*. Insertion of the sub-plate wefts 23 is performed only at the first projection 42*a*.

Figure 3B:
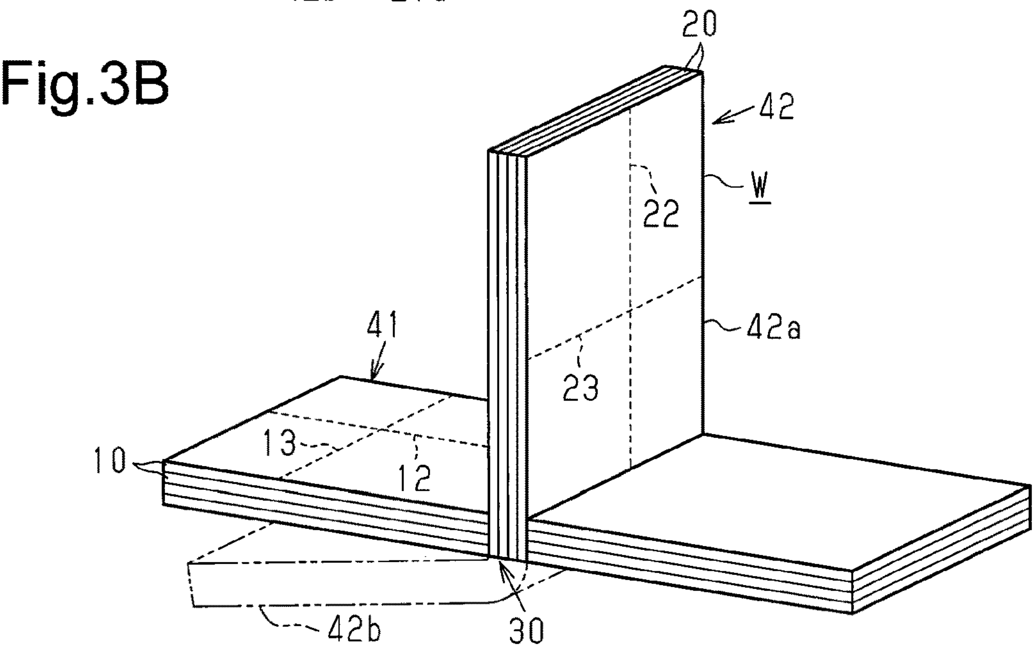
FIG. 3B is a perspective view showing the main plate precursor and the sub-plate precursor arranged upright with respect to the main plate precursor.

Subsequently, as shown in FIG. 3B, the first projection 42*a* of the sub-plate precursor 42 is arranged upright with respect to the main plate precursor 41 so that the sub-plate warps 22 forming the first projection 42*a* are orthogonal to the main plate warps 12 of the main plate precursor 41. The second projection 42*b* of the sub-plate precursor 42 is cut away from the root of the second projection 42*b* proximate to the intersecting portion 30 to remove the second projection 42*b* from the fiber precursor 40. Consequently, the T-shaped fibrous structure W is fabricated from the main plate precursor 41 and the sub-plate precursor 42.

The T-shaped fibrous structure W is impregnated with the thermosetting matrix resin Ma that is then hardened. The impregnation and hardening of the matrix resin Ma are performed in a resin transfer molding (RTM) process. More specifically, the fibrous structure W is enclosed in a mold including recesses and projections, and the thermosetting matrix resin Ma is injected into the mold and hardened. This molds the fibrous structure W.

The above embodiment has the advantages described below.

(1) In the T-shaped fibrous structure W, the intersecting portion 30 of the main plate 11 and the sub-plate 21 is free from the main plate wefts 13 and the sub-plate wefts 23, and the main plate wefts 13 and the sub-plate wefts 23 have a smaller volume density in the intersecting portion 30 than locations separate from the intersecting portion 30. This reduces the thickness of the intersecting portion 30 and the weight of the fibrous structure W as compared to when the intersecting portion 30 includes the main plate wefts 13 and the sub-plate wefts 23 in addition to the main plate warps 12 and the sub-plate warps 22.

Further, as compared to when the intersecting portion 30 includes the main plate wefts 13 and the sub-plate wefts 23, the main plate warps 12 and the sub-plate warps 22 that form the intersecting portion 30 resist bending. As a result, in the intersecting portion 30, the straightness of the main plate warps 12 and the sub-plate warps 22 is maintained, and decreases in the strength at the intersecting portion 30 are limited.

(2) As described in the Background Art section, a T-shaped separate textile may be coupled to a flat textile to fabricate the T-shaped fibrous structure W. In this case, the separate textile includes a flange that provides a margin used when coupling the separate textile to the flat textile. This increases the weight and material cost of the fibrous structure. However, in the fibrous structure W of the present embodiment, the main plate 11 and the sub-plate 21 are woven integrally with each other. This eliminates the need for a flange that provides a coupling margin and thus reduces the weight and material cost of the fibrous structure.

In addition, as described in the Background Art section, a separate T-shaped textile may be formed by coupling two textiles that are bent to be L-shaped. In this case, the strength at the L-shaped bent portions is decreased. The strength at the fiber-reinforced composite material is the strength at the portion of the fibrous structure that has the lowest strength. Thus, when the fibrous structure includes the L-shaped bent portions and the flange coupled to the flat textile imparts a higher strength to the coupling portion than the bent portions, the strength at the coupled portion is greater than necessary. This only increases the weight of the fibrous structure.

In the present embodiment, even though the fibrous structure W is T-shaped, the fibrous structure W is formed by integrally weaving and intersecting the main plate 11 and the sub-plate 21, and the fibrous structure W does not include bent portions like an L-shaped textile. Accordingly, the fibrous structure W does not include portions where the strength decreases or portions that are unnecessary.

(3) The straightness of the main plate warps 12 is maintained in the main plate 11, and the straightness of the sub-plate warps 22 is maintained in the sub-plate 21. This limits decreases in the strength at the main plate 11 and the sub-plate 21.

The above embodiment may be modified as described below.

Figure 4:
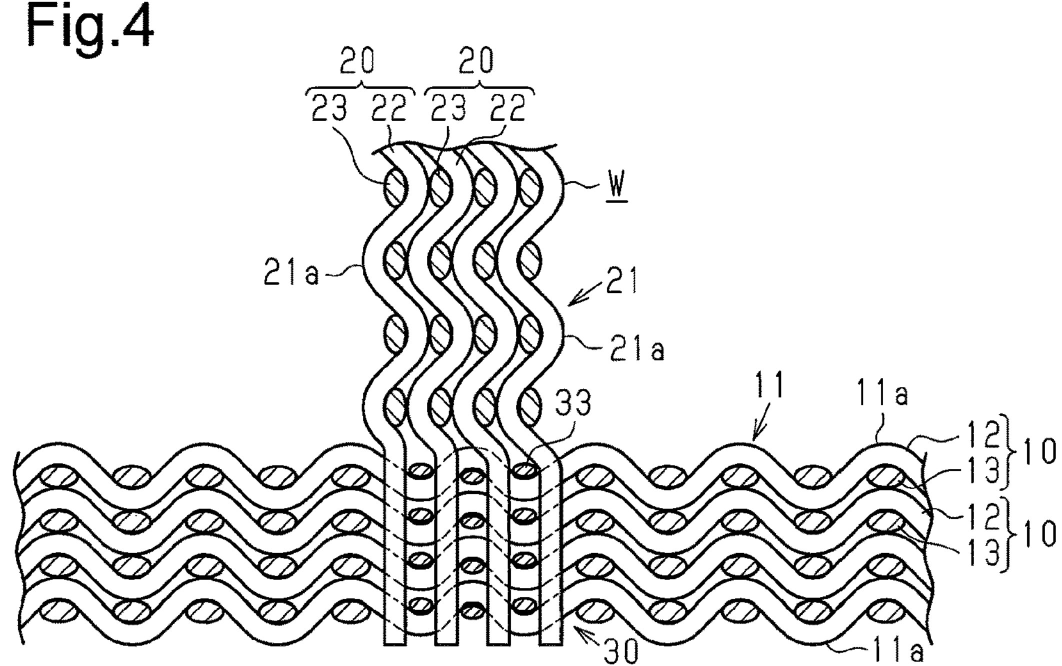
FIG. 4 is a cross-sectional view showing another example of a fibrous structure that has thinner wefts.

As shown in FIG. 4, the intersecting portion 30 may include main plate wefts 33. More specifically, the main plate 11 may have a textile structure including the main plate warps 12 and the main plate wefts 33 in the intersecting portion 30. In this case, the main plate wefts 33 in the intersecting portion 30 are thinner than the main plate wefts 13 in portions of the main plate 11 other than the intersecting portion 30 and the sub-plate wefts 23 in portions of the sub-plate 21 other than the intersecting portion 30. The yarns (main plate wefts 33) extending in the Y direction have a smaller volume density in the intersecting portion 30 than in portions separate from the intersecting portion 30.

In such a structure, the textile structure in which the intersecting portion 30 includes the main plate wefts 33 increases the efficiency for maintaining the shape of the intersecting portion 30 as compared to when there are no yarns extending in the Y direction.

The yarns extending in the Y direction used for the intersecting portion 30 may be sub-plate wefts included in the sub-plate 21. That is, the sub-plate 21 may include a textile structure having the sub-plate warps 22 and the sub-plate wefts in the intersecting portion 30. Alternatively, the main plate wefts 33 forming the main plate 11 and the sub-plate wefts forming the sub-plate 21 may both be used in the intersecting portion 30 as yarns extending in the Y direction.

Figure 5:
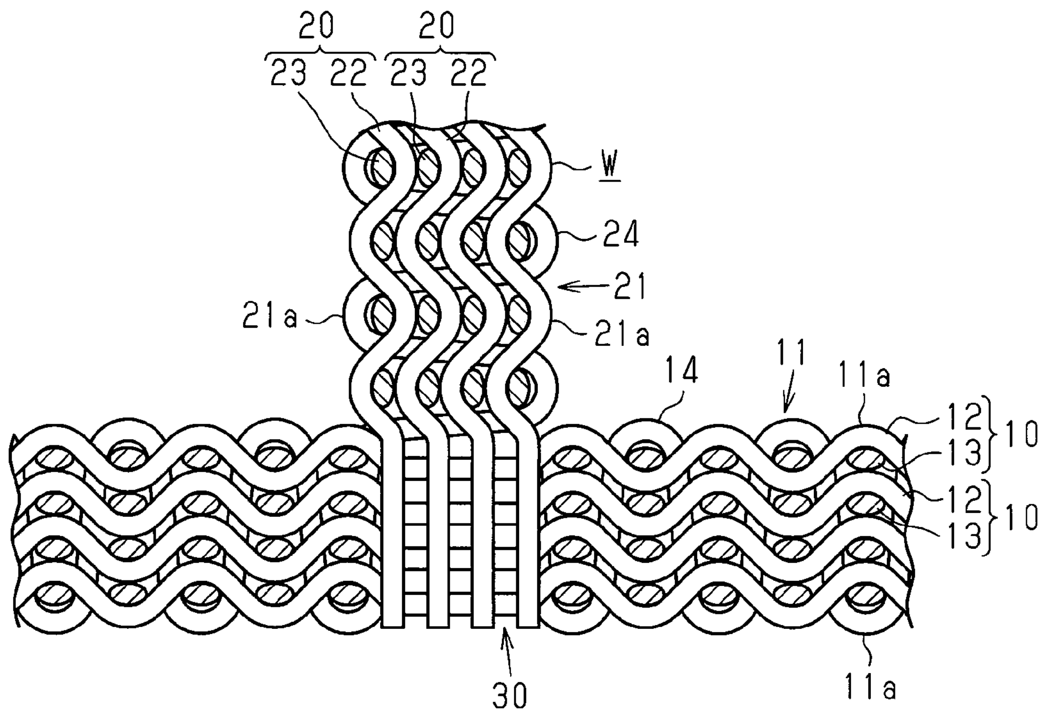
FIG. 5 is a cross-sectional view showing a further example of a fibrous structure.
Figure 6A:
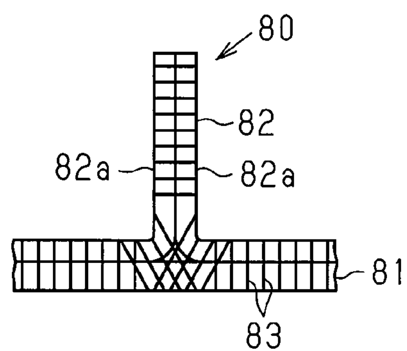
FIGS. 6A and 6B are diagrams showing the prior art.
Figure 6B:
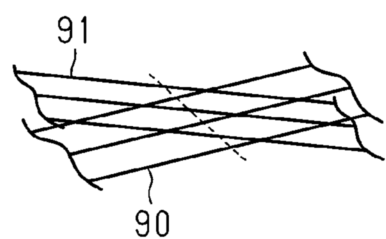

As shown in FIG. 5, in the main plate 11, the main plate fiber layers 10 may be coupled to one another in the stacking direction (thickness-wise direction) by thickness-wise direction yarns 14. In the sub-plate 21, the sub-plate fiber layers 20 may be coupled to one another in the stacking direction (thickness-wise direction) by thickness-wise direction yarns 24.

When fabricating the fiber precursor 40, such a structure limits separation of the main plate fiber layers 10 in the main plate precursor 41 and separation of the sub-plate fiber layers 20 in the sub-plate precursor 42.

In the embodiment, the direction in which the main plate warps 12 extend in the main plate 11 is orthogonal to the direction in which the sub-plate warps 22 extend in the sub-plate 21. However, the extending direction of the main plate warps 12 may slightly deviate from a state orthogonal to the extending direction of the sub-plate warps 22.

When fabricating portions separate from the intersecting portion 30 of the fiber precursor 40, for example, the feeding speed (feeding amount) of the main plate warps 12 is decreased and the number of the main plate wefts 13 is increased so that the yarn extending in the Y direction has a larger volume density. As a result, the number of the main plate wefts 13 is smaller in the intersecting portion 30 than in portions separate from the intersecting portion 30, and the volume density of the yarn extending in the Y direction is smaller in the intersecting portions 30 than in the portions separate from the intersecting portion 30.

The textile weaving of the main plate 11 and the sub-plate 21 does not have to be plain weaving and may be satin weaving or twill weaving.

The main plate 11 and the sub-plate 21 are formed through textile weaving such as plain weaving. Instead, for example, in the main plate 11, a fiber layer including the main plate wefts 13 arranged in parallel to one another may be stacked on a fiber layer including the main plate warps 12 arranged in parallel to one another, and the fiber layers may be coupled by thickness-wise direction yarns to form a multi-layer textile. In this case, the main plate 11 has a two-axis orientation. Instead, the number of yarns may be increased so that the main plate 11 has a three-axis or four-axis orientation. In the same manner, in the sub-plate 21, a fiber layer including the sub-plate wefts 23 arranged in parallel to one another may be stacked on a fiber layer including the sub-plate warps 22 arranged in parallel to one another, and the fiber layers may be coupled by thickness-wise direction yarns to form a multi-layer textile. In this case, the sub-plate 21 has a two-axis orientation. Instead, the number of yarns may be increased so that the sub-plate 21 has a three-axis or four-axis orientation.

In the embodiment, a thermosetting resin is used as the matrix resin Ma. Instead, other types of resins may be used as the matrix resin Ma.

In the embodiment, the number of the main plate fiber layers 10 of the main plate 11 is four. Instead, the number of the main plate fiber layers 10 of the main plate 11 may be two, three, or five or more. The number of the sub-plate fiber layers 20 of the sub-plate 21 is four. Instead, the number of the sub-plate fiber layers 20 of the sub-plate 21 may be two, three, or five or more.

The method for fabricating the fiber-reinforced composite material M by impregnating the fibrous structure W with the matrix resin Ma and hardening the matrix resin Ma is not limited to the RTM process.

The invention claimed is:

1. A fibrous structure comprising:

a main plate, which is formed by a multi-layer textile, including a plurality of stacked fiber layers, wherein each fiber layer includes main plate warps and main plate wefts; and a sub-plate, which is formed by a multi-layer textile, including a plurality of stacked fiber layers, wherein each fiber layer includes sub-plate warps and sub-plate wefts, wherein the main plate and the sub-plate are integrally woven with each other in a state intersecting each other, the main plate wefts and the sub-plate wefts have a smaller volume density at an intersecting portion where the main plate and the sub-plate intersect than a portion separate from the intersecting portion, and the main plate warps in the intersecting portion extend straight in parallel to one another and the sub-plate warps in the intersecting portion extend straight in parallel to one another.

2. The fibrous structure according to claim 1, wherein the intersecting portion only includes the main plate warps and the sub-plate warps.

3. The fibrous structure according to claim 1, wherein the intersecting portion is configured to be free from the main plate wefts and the sub-plate wefts.

4. The fibrous structure according to claim 1, wherein at least either one of the main plate wefts and the sub-plate wefts are thinner at the intersecting portion than a portion separate from the intersecting portion.

5. The fibrous structure according to claim 1, wherein the sub-plate is orthogonal to the main plate, and the fibrous structure is T-shaped.

6. The fibrous structure according to claim 1, wherein the sub-plate functions as a reinforcement rib.

7. A fiber-reinforced composite material comprising:

the fibrous structure according to claim 1; and a matrix resin with which the fibrous structure is impregnated.

* * * * *